United States Patent
Oyang et al.

(10) Patent No.: US 7,151,950 B1
(45) Date of Patent: *Dec. 19, 2006

(54) INTEGRATED CONNECTION ASSEMBLY FOR GLOBAL POSITIONING SYSTEM (GPS) RECEIVER AND PERSONAL DIGITAL ASSISTANCE (PDA) DEVICE AND CELLULAR PHONE

(75) Inventors: James Oyang, Palos Verdes, CA (US); Anchyun Wang, Cerritos, CA (US)

(73) Assignee: Pharos Science & Applications, Inc., Torrance, CA (US)

( * ) Notice: Subject to any disclaimer, the term of this patent is extended or adjusted under 35 U.S.C. 154(b) by 147 days.

This patent is subject to a terminal disclaimer.

(21) Appl. No.: 10/962,345

(22) Filed: Oct. 8, 2004

Related U.S. Application Data

(63) Continuation-in-part of application No. 09/710,211, filed on Nov. 10, 2000, now Pat. No. 6,909,907.

(51) Int. Cl.
    *H04M 1/00* (2006.01)

(52) U.S. Cl. .............. 455/556.1; 455/569.2; 455/556.2; 455/557; 455/572; 340/988

(58) Field of Classification Search .. 455/556.1–556.2, 455/557, 559, 569.2, 575, 571–572, 550.1, 455/41.2, 90.3, 345–349; 701/1, 10; 340/825.52; 349/502
    See application file for complete search history.

(56) References Cited

U.S. PATENT DOCUMENTS

| | | | | |
|---|---|---|---|---|
| 4,061,971 A | * | 12/1977 | Barrons | 455/90.3 |
| 5,121,504 A | * | 6/1992 | Toko | 455/575.9 |
| 5,177,667 A | * | 1/1993 | Graham et al. | 361/715 |
| 5,479,479 A | * | 12/1995 | Braitberg et al. | 455/404.1 |
| 5,497,339 A | * | 3/1996 | Bernard | 342/357 |
| 5,528,248 A | * | 6/1996 | Steiner et al. | 342/357.06 |
| 5,895,431 A | * | 4/1999 | Miller et al. | 455/575.9 |
| 6,007,372 A | * | 12/1999 | Wood | 439/502 |
| 6,048,184 A | * | 4/2000 | Chang et al. | 455/575 |
| 6,121,922 A | * | 9/2000 | Mohan | 342/357.1 |
| 6,280,243 B1 | * | 8/2001 | Liu et al. | 439/502 |
| 6,283,789 B1 | * | 9/2001 | Tsai | 439/502 |
| 6,532,374 B1 | * | 3/2003 | Chennakeshu et al. | 455/569.1 |
| 6,799,052 B1 | * | 9/2004 | Agness et al. | 455/456.4 |
| 2001/0034577 A1 | * | 10/2001 | Grounds et al. | 701/207 |
| 2002/0173344 A1 | * | 11/2002 | Cupps et al. | 455/566 |
| 2003/0148788 A1 | * | 8/2003 | Kwak | 455/557 |
| 2004/0129522 A1 | * | 7/2004 | Skowronski | 191/12.2 R |
| 2005/0282504 A1 | * | 12/2005 | Yeh | 455/569.2 |

* cited by examiner

*Primary Examiner*—Erika A. Gary
*Assistant Examiner*—Kamaran Afshar
(74) *Attorney, Agent, or Firm*—Thomas I. Rozsa; Tony D. Chen

(57) ABSTRACT

A complete and versatile solution that offers a comprehensive suite of integral products for electrical coupling and electronic communication and data-transfer between GPS receivers and portable electronic devices such as PDA device, cellular phones, notebook or laptop computers, etc., that utilizes various interfacing devices and technologies including USB ports, Compact/Flash cards, PC cards, and BlueTooth enabled wireless capacities, etc.

20 Claims, 5 Drawing Sheets

INTEGRATED CONNECTION ASSEMBLY FOR GLOBAL POSITIONING SYSTEM (GPS) RECEIVER AND PERSONAL DIGITAL ASSISTANCE (PDA) DEVICE AND CELLULAR PHONE

This application is a continuation-in-part application of patent application Ser. No. 09/710,211 filed on Nov. 10, 2000, now U.S. Pat. No. 6,909,907.

BACKGROUND OF THE INVENTION

1. Field of the Invention

The present invention relates generally to the field of connector cables and accessories used together with portable electronic devices. More particularly, the present invention relates to the field of connector cable and accessories for interconnecting global positioning satellite (GPS) receivers and personal digital assistance (PDA) devices or cellular phones.

2. Description of the Prior Art

Generally, cables and accessories used together with portable electronic devices have been introduced in the art. For example, connectors and cables for powering a portable electronic device or cellular phone from a vehicle cigaret lighter or similar power source have been introduced in the art. In addition, various data cables used for interlinking portable electronic devices have also been introduced in the art.

Recently, personal digital assistance (PDA) devices such as Microsoft® Pocket PC™ or Palm® portable computers are widely used. In addition, small and compact sized global positioning satellite (GPS) receivers have also became more popular. One trend of a combined use of these devices is to connect a GPS receiver with a PDA and turn it into a personal mobile navigation system or mobile telematic systems.

In addition, some new cellular phones are designed and constructed with large display screens and more powerful processors, allowing the cellular phones to be used, in combination with a GPS receiver, as a personal mobile navigation system.

However, many PDA and cellular phone accessories and cables are designed to be used only with a particular type or model of PDA devices or cellular phones, without taking into the consideration of a combined use of a GPS receiver and a PDA device or cellular phone. Therefore, it is desirable to provide an integrated connection assembly for and a GPS receiver and a PDA device or cellular phone to provide mobile people with location sensitive information, to guide them to their destination effectively, and to provide faster assistance when they need help on the road.

Furthermore, new PDA devices are more likely to be equipped with or adapted to work with additional communication and/or data sharing devices, such as Compact/Flash cards or BlueTooth enabled devices. It is also desirable to provide a more complete and versatile connection solution or a suite of products for the communication and data-transfer between a GPS receiver and a PDA device (or similarly equipped cellular phone or notebook computer).

SUMMARY OF THE INVENTION

The present invention is integrated connection assembly for a global positioning satellite (GPS) receiver and a personal digital assistance (PDA) device or cellular phone.

It is an object of the present invention to provide a unique and integrated power and data exchange cable connecter assembly for interconnecting a GPS receiver and a PDA device or cellular phone used together in a vehicle to form an instant mobile navigation system It is also an object of the present invention to provide a unique and integrated power and data exchange cable connecter assembly for interconnecting a GPS receiver and a PDA device or cellular phone to provide mobile people with location sensitive information.

It is another object of the present invention to provide a unique and integrated power and data exchange cable connecter assembly for interconnecting a GPS receiver and a PDA device or cellular phone to guide mobile people to their destination effectively.

It is an additional object of the present invention to provide a unique and integrated power and data exchange cable connecter assembly for interconnecting a GPS receiver and a PDA device or cellular phone to provide mobile people with faster assistance when they need help on the road.

It is a further object of the present invention to provide a unique and integrated power and data exchange cable connecter assembly for interconnecting a GPS receiver and a PDA device or cellular phone that is compact, durable and easy to use.

Described generally, the present invention is an integrated connection assembly for a global positioning satellite (GPS) receiver and a personal digital assistance (PDA) device or cellular phone. The integrated connection assembly includes a power adapter, an interface unit, a filter unit, connecters for the GPS receiver and for the PDA device or cellular phone, and cable links. The power adapter has an external power connector adapted to be connected to an external power source for obtaining an external power, and an internal transformer and charger for converting the external power to a direct current power suitable for the PDA device and the GPS receiver. The interface unit has internal interface circuitry for interfacing with different interfaces of the GPS receiver and the PDA device or cellular phone. The filter unit has internal filter circuitry for preventing interferences between the GPS receiver and the PDA device or cellular phone. The cable links electrically and electronically interconnect and couple the power adapter, the interface unit, the filter unit, the GPS connecter and the PDA or cellular phone connecter to provide the direct current power to the GPS receiver and the PDA device or cellular phone. At least a portion of the cable links between the GPS connecter and the PDA or cellular phone connecter and is also capable of providing data transfer therebetween.

Furthermore, the present invention is also directed to a complete and versatile connection solution that includes a suite of integrated products for communication and data-transfer between a GPS receiver and a PDA device (or a similarly equipped cellular phone or notebook computer) that are compatible with the more recent and advanced data communication and transfer devices and protocols.

It is therefore also an object of the present invention to provide a unique and versatile solution that comprises a complete suite of integral products for communication and data-transfer between GPS receivers and PDA devices that interconnects a GPS receiver and a PDA device together to form an instant mobile navigation system.

It is also another object of the present invention to provide a unique and versatile solution that offers a suite of integral connection products, including a GPS adapter that utilizes the Compact/Flash card slot and capacity of a PDA device (or the PCM card slot and capacity of a notebook computer) for interconnecting a GPS receiver and the PDA device (or the notebook computer) to form a mobile navigation system.

It is also an additional object of the present invention to provide a unique and versatile solution that offers a suite of integral connection products, including a BlueTooth docking station that utilizes the BlueTooth capacity of a PDA device (or similarly equipped cellular phones or notebook or laptop computers) for wireless communication based on the Blue-Tooth technology between a GPS receiver and the PDA device (or a similarly equipped cellular phone or notebook or laptop computer) that forms a mobile navigation system.

It is also a further object of the present invention to provide a unique and versatile solution that offers a suite of integral connection products, including a USB cable connector (or PC card adaptor) that utilizes the USB port and capacity (or the PC card slot and capacity) of a notebook or laptop computer for interconnecting a GPS receiver and the notebook or laptop computer to form a mobile navigation system.

Accordingly, described also generally, the present invention is an integrated connection assembly for a global positioning satellite (GPS) receiver and a personal digital assistance (PDA) device or cellular phone that has a Compact/Flash card slot. The present invention integrated connection assembly includes an integral adaptor having an upper section and a lower section, where the upper section has a flat extended backing panel and two oppositely disposed wrapped-around side guards for receiving and retaining the GPS receiver, and the lower section has internal integrated circuitry components for carrying out electronic communication and data-transfer with the PDA device or cellular phone, and an external profile of a Compact/Flash card for insertion into the Compact/Flash card slot of the PDA device or cellular phone. The integral adaptor also has a terminal connector integrally formed at the junction of the upper and lower sections of the integral adaptor for connection with a terminal port of the GPS receiver. When the terminal connector is connected to the internal integrated circuitry components of the integral adaptor, electrical continuity and electronic communication and data-transfer are established between the GPS receiver and the PDA device or cellular phone through the integral adaptor.

Alternatively described also in general, the present invention is an integrated connection assembly for a global positioning satellite (GPS) receiver and a portable electronic device that is BlueTooth enabled. The present invention integrated connection assembly includes an integral docking station having a housing and internal integrated circuitry components for carrying out wireless electronic communication and data-transfer based on BlueTooth technology with the BlueTooth enabled portable electronic device. The housing of the docking station has a top surface with a recess for receiving and retaining the GPS receiver. The docking station has an electrical power source for providing electrical power to the internal integrated circuitry components of the docking station, and a terminal connector integrally formed with the housing and located adjacent to the recess at the top surface of the housing for connection with a terminal port of the GPS receiver. The terminal connector is connected to the internal integrated circuitry components of the docking station for powering the GPS receiver and establishing electronic communication and data-transfer between the GPS receiver and the BlueTooth enabled portable electronic device through the docking station.

Also further described generally, the present invention is an integrated connection assembly for a global positioning satellite (GPS) receiver and a portable computer having an USB port or PC card slot. The present invention integrated connection assembly includes a GPS receiver connector for connecting to the GPS receiver, a USB or PC card connector for connecting to the USB port or PC card slot of the portable computer, a filter unit having internal filter circuitry for preventing interferences between the GPS receiver and the portable computer, and a cable link for electrically and electronically interconnecting and coupling the GPS receiver connector, the USB or PC card connecter and the filter unit, to establish electrical continuity and electronic communication between the GPS receiver and the portable computer.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
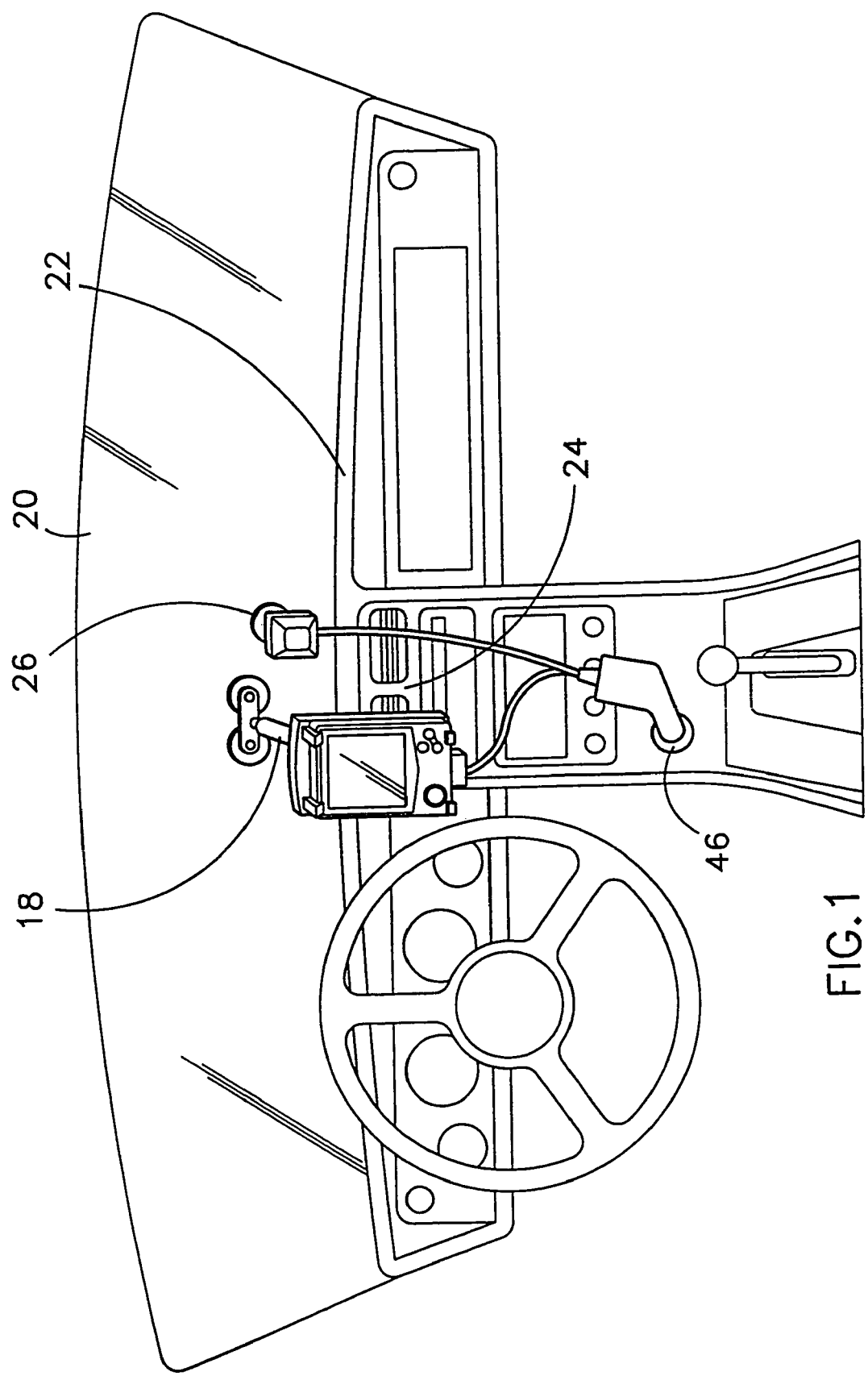
FIG. 1 is a perspective view showing the present invention integrated connection assembly interconnecting a GPS receiver and a PDA device or cellular phone and used together in a vehicle to form an instant mobile navigation system.
Figure 2:
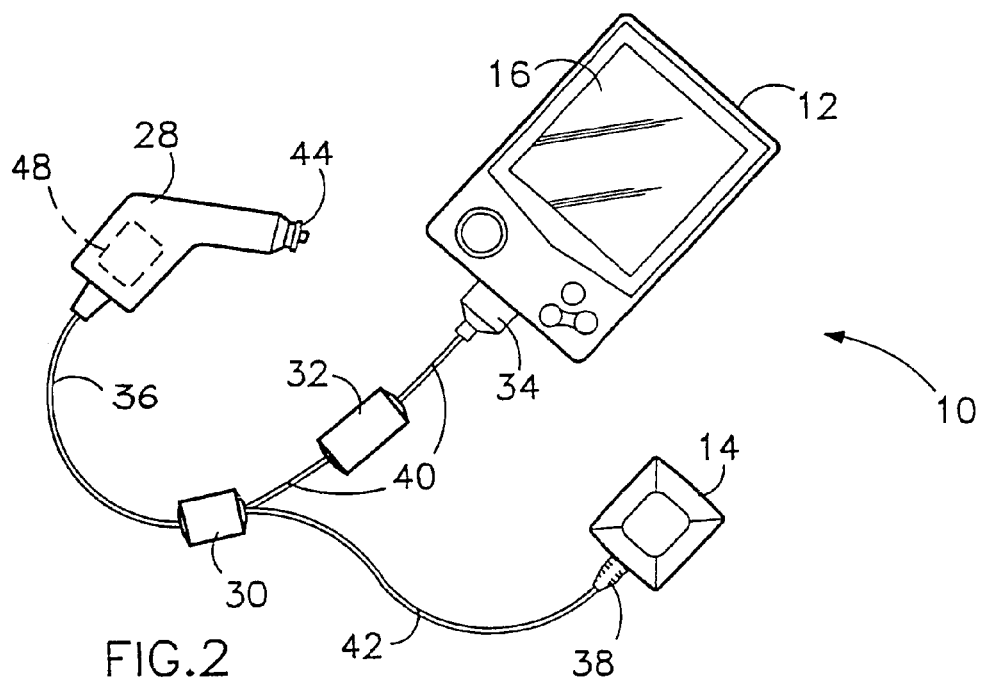
FIG. 2 is a perspective view showing the present invention integrated connecter assembly for a GPS receiver and a PDA device or cellular phone.

Referring to FIGS. 1 and 2, there is shown the present invention integrated connection assembly 10 for a personal digital assistance (PDA) device 12 and a global positioning satellite (GPS) receiver 14. In a typical application, a user uses the PDA devices 12, such as a Microsofte Pocket PC™ or a Palm® portable computer, or a cellular phone (not shown), and a GPS receiver 14 together as a mobile navigation system. With appropriate software program installed and executing in the PDA device 12, the satellite signals received by the GPS receiver 14 are processed and computed by the PDA device 12 and the instant location of the user can be displayed on a map shown on the display screen 16 of the PDA device 12.

Referring to FIG. 1 particularly, there is shown a typical set up in a user's vehicle. The PDA 12 may be held by a mounting bracket 18 to the windshield 20 (as shown) or dashboard 22 or the instrument panel 24, or other convenient places of the vehicle. The GPS 14 may be held by a retaining device 26 to the windshield 20 (as shown) or dashboard 22 or other convenient places of the vehicle.

It is preferable that the PDA device 12 is positioned to be easily viewed by the user, and the GPS receiver 14 is positioned at a location not shielded by the frame structure of the vehicle so that the sensitivity of the GPS receiver 14 is not compromised.

Referring again to FIG. 2, the present invention integrated connection assembly 10 includes a power adaptor 28, an interface unit 30, a filter unit 32, a PDA connecter 34, a GPS connecter 36, and cable links 38, 40 and 42.

The power adapter 28 has a vehicle cigaret lighter connecter 44 which can be plugged into a vehicle cigaret lighter socket 46 (shown in FIG. 1) or other vehicle power sockets for drawing electric power from the vehicle's battery. The power adapter 28 also contains an internal transformer and changer 48 converting the typical 12V DC of the vehicle's battery power to 5V, 3A DC as the power source for both the PDA device 12 and the GPS receiver 14. The internal transformer and changer 48 also charges the internal rechargeable battery of the PDA device 12.

The interface unit 30 has an internal electronic circuitry for handling the different interfaces between the PDA device 12 and the GPS receiver 14. For example, some PDA devices may have an USB interface while the GPS receivers may have an RS232 interface. The internal interface circuitry will match these different interfaces to insure smooth data transfer therebetween. Cable link 38 interconnects and electrically and electronically couples the power adapter 28 and the interface unit 30.

The filter unit 32 has an internal electronic filter circuitry for shielding electronic interferences and noises between the PDA device 12 and the GPS receiver 14 to prevent any compromise of the sensitivity of the GPS receiver 14. The filter circuitry also provides shielding between the power adapter 28 and the PDA device 12.

The PDA connecter 34 is designed to be plugged into an external interface port of the PDA device 12. Cable links 40 interconnect and electrically and electronically couple the interface unit 30, the filter unit 32, and PDA connecter 34.

Similarly, the GPS connecter 36 is designed to be plugged into an external interface port of the GPS receiver 14. Cable link 42 interconnects and electrically and electronically couples the interface unit 30 and the GPS connecter 38.

Figure 3:
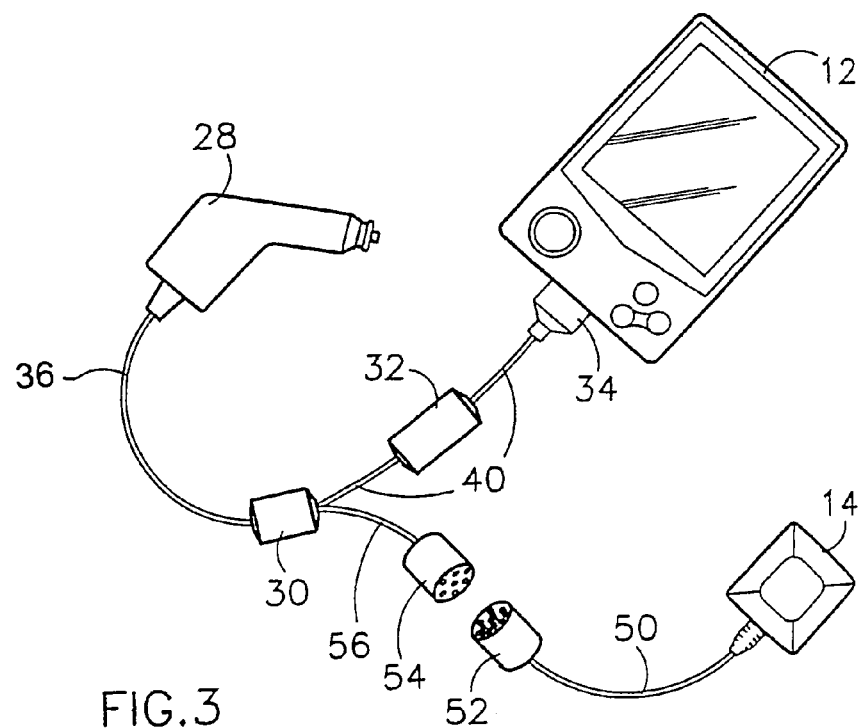
FIG. 3 is a perspective view showing an alternative embodiment of the present invention integrated connecter assembly for a GPS receiver and a PDA device or cellular phone.

Referring to FIG. 3, there is shown an alternative embodiment of the present invention. In this alternative embodiment, the GPS receiver 14 has an external cable 50 which is an integral and built-in part of the GPS receiver 14 and which terminates into an external connecter 52. In this case, no separate external connecter 38 is needed. However, a complimentary connecter 54 is provided for connection with the external connecter 52 of the GPS receiver 14. When connecters 52 and 54 are connected, the GPS receiver 14 is electrically and electronically coupled with the remaining parts of the connecter assembly 10.

It is noted that cable links 40, 42, 50 and 56 are capable of providing not only electrical power to the PDA device 12 and the GPS receiver 14 respectively, but also data transfer between the PDA device 12 and the GPS receiver 14.

It is also noted that while a PDA device is discussed hereinabove and shown in the figures, it may be replaced by a cellular phone which has similar functions as the PDA device in connection with this mobile navigation application.

The present invention integrated connection assembly for GPS receivers and PDA devices or cellular phones has many advantages. It provides a simple and unified apparatus for interconnecting and powering a GPS receiver and a PDA device or cellular phone. It can be used as a compact and portable navigation system for many equipments, vehicles, motorcycles, boats, etc. It is also of simple construction and very easy to use. It further conforms to conventional forms of manufacture or any other conventional way known to those persons skilled in the pertinent art.

Defined in detail, the present invention is an integrated connection assembly for a global positioning satellite (GPS) receiver and a personal digital assistance (PDA) device or cellular phone, comprising: (a) a power adapter having an external power connector adapted to be connected to an external power source for obtaining an external power, and an internal transformer and charger for converting said external power to a direct current power suitable for said GPS receiver and said PDA device or cellular phone; (b) an interface unit having internal interface circuitry for interfacing with different interfaces of said GPS receiver and said PDA device or cellular phone; (c) a filter unit having internal filter circuitry for preventing interferences between said GPS receiver and said PDA device or cellular phone; (d) a GPS connector for connecting to said GPS receiver; (e) a PDA or cellular phone connector for connecting to said PDA device or cellular phone; (f) a cable link for electrically and electronically interconnecting and coupling said power adapter, said interface unit, said filter unit, said GPS connecter and said PDA or cellular phone connecter to provide said direct current power to said GPS receiver and said PDA device or cellular phone; and (g) at least a portion of said cable link between said GPS connecter and said PDA or cellular phone connecter also being capable of providing data transfer therebetween.

Defined alternatively, the present invention is an integrated connection assembly for a global positioning satellite (GPS) receiver and a personal digital assistance (PDA) device or cellular phone, where said GPS receiver has an integral cable link connected to an external connecter, comprising: (a) a power adapter having an external power connector adapted to be connected to an external power source for obtaining an external power, and an internal transformer and charger for converting said external power to a direct current power suitable for said GPS receiver and said PDA device or cellular phone; (b) an interface unit having internal interface circuitry for interfacing with different interfaces of said GPS receiver and said PDA device or cellular phone; (c) a filter unit having internal filter circuitry for preventing interferences between said GPS receiver and said PDA device or cellular phone; (d) a complimentary connector for connecting with said external connecter of said GPS receiver; (e) a PDA or cellular phone connector for connecting to said PDA device or cellular phone; (f) a cable link for electrically and electronically interconnecting and coupling said power adapter, said interface unit, said filter unit, said GPS connecter and said PDA connecter or cellular phone to provide said direct current power to said GPS receiver and said PDA device or cellular phone; and (g) at least a portion of said cable link between said complimentary connecter and said PDA or cellular phone connecter also being capable of providing data transfer therebetween.

Defined broadly, the present invention is an integrated connection assembly for a global positioning satellite (GPS) receiver and a personal digital assistance (PDA) device or a cellular phone, comprising: (a) a power adapter having an external power connector adapted to be connected to an external power source for obtaining an external power, and an internal transformer and charger for converting said external power to an internal power suitable for said GPS receiver and said PDA device or cellular phone; (b) an internal interface circuitry for interfacing with different interfaces of said GPS receiver and said PDA device or cellular phone; (c) an internal filter circuitry for preventing interferences between said GPS receiver; (d) means for providing connection to said GPS receiver; (e) means for providing connection to said PDA device or cellular phone; (f) cable means for electrically and electronically interconnecting and coupling said power adapter, said interface circuitry, said filter circuitry, said GPS connection means and said PDA or cellular phone connection means to provide said internal power to said GPS receiver said PDA device or cellular phone; and (g) at least part of said cable means between said GPS connection means and said PDA or cellular phone connection means also being capable of providing data transfer therebetween.

In addition, the present invention is also directed to a complete and versatile connection solution for portable GPS receivers and PDAs that are used to form mobile navigation systems. The present invention solution provides a complete suite of integrated products for communication and data-transfer between a GPS receiver and a PDA device (or a similarly equipped cellular phone or notebook computer) that are compatible with the more recent and advanced data communication and transfer devices and protocols.

Figure 4:
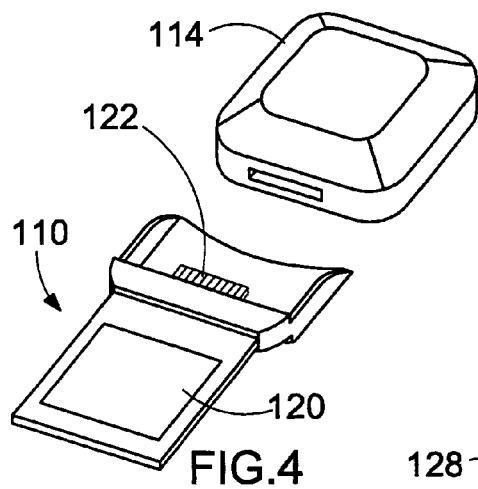
FIG. 4 is a perspective view illustrating one of a suite of integrated products of the present invention complete and versatile solution for interconnecting and data-transferring between a GPS receiver and a PDA device (or a similarly equipped cellular phone or notebook computer), showing a Compact/Flash card adaptor for a GPS receiver.
Figure 5:
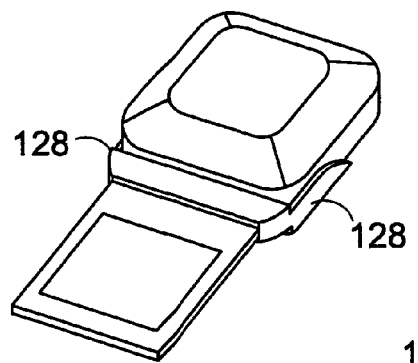
FIG. 5 is a perspective view illustrating the GPS receiver connected to and received by the Compact/Flash card adaptor.
Figure 6:
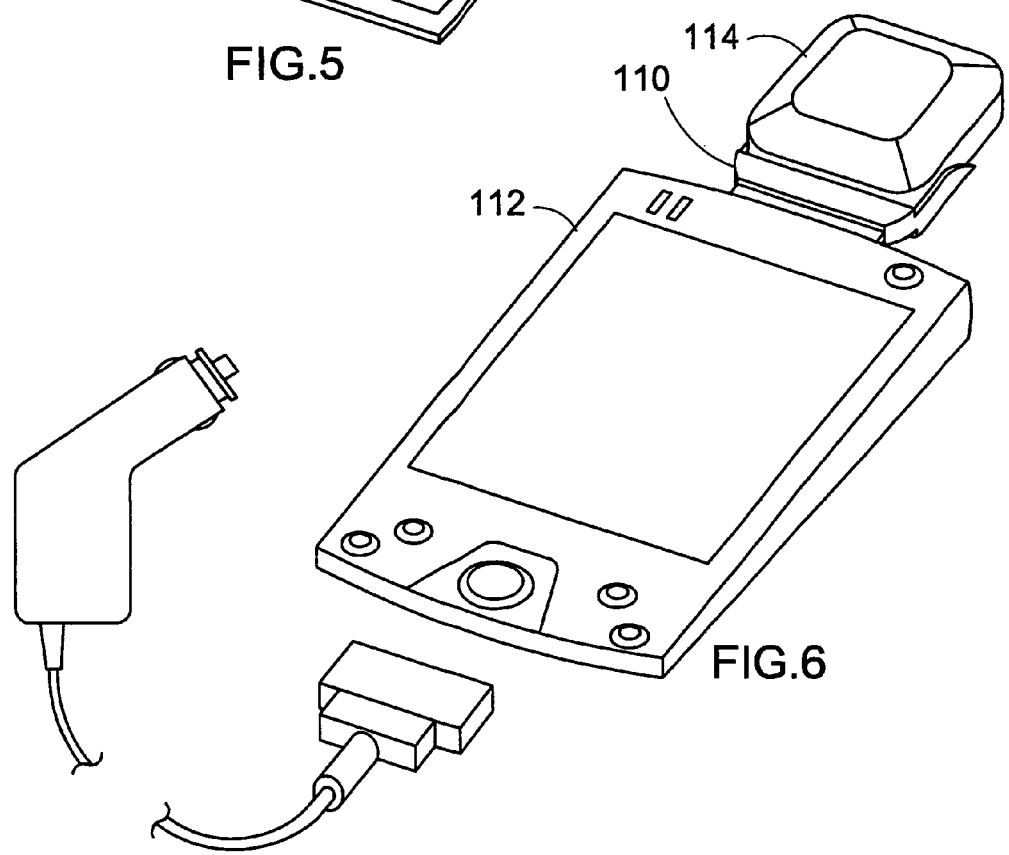
FIG. 6 is a perspective view illustrating the GPS receiver connected to a PDA device (or a similarly equipped cellular phone or notebook computer) by the Compact/Flash adaptor.

Referring to FIGS. 4 through 6, there is illustrated one of the preferred embodiments of the present invention, showing a GPS adapter 110 that utilizes the Compact/Flash card slot and capacity of a PDA device 112 (or the PCM card slot and capacity of a notebook computer) for interconnecting a GPS receiver 114 and the PDA device 114 to form a mobile navigation system.

Many PDA devices now are equipped with a Compact/Flash card slot for receiving a Compact/Flash card that can serve various additional purposes for the PDA device.

To utilize this technological advancement, the present invention provides an adaptor 110 for connecting the GPS receiver 114 to the PDA device 112. The adaptor 110 has two (2) main sections: a lower section 120 that has the profile of a Compact/Flash card for insertion into the Compact/Flash card slot or socket of the PDA device 112 and also the integrated circuitry (IC) components for its electrical continuity and electronic communication and data transfer functions, and a male terminal connector 122 for insertion into a complimentary female terminal connector slot or socket of the GPS receiver 114, and an upper section 124 for receiving and supporting the GPS receiver.

As shown in FIG. 4, the upper section 124 of the adaptor 110 incorporates a flat extended backing panel 126 for supporting the weight of the GPS receiver 114 and two oppositely disposed side guards 128 that wrap around the lower part of the GPS receiver 114 when it is received by the adaptor 110 and connected to the PDA device 112.

The backing panel 126 and side guards 128 of the adaptor 110 together provides a snug fit with the GOS receiver 114 to assure a firm attachment and secure connection between the male terminal connector 122 of the adaptor 110 and the complimentary female terminal connector slot of the GPS receiver 114 when it is attached to the adaptor 110 as shown in FIG. 5.

As shown in FIG. 6, when the GPS receiver 114 is attached to the PDA device 112 through the adaptor 110, there is formed instantly a compact handheld mobile navigation system that combines the GPS functionality of the GPS receiver 114 with the computing power of the PDA device 112. In this configuration, the GPS receiver 114 is powered through the PDA device 112.

As a total and versatile solution for providing communication and data-transfer between a GPS receiver and a PDA device (or a similarly equipped cellular phone or notebook computer), the suite of the integral products provided by the present invention also includes a BlueTooth docking station that utilizes the BlueTooth capacity of a PDA device (or a similarly equipped cellular phone or notebook computers) for wireless communication between a GPS receiver and the BlueTooth enabled PDA device (or the cellular phone or notebook computers) to form a mobile navigation system.

Figure 7:
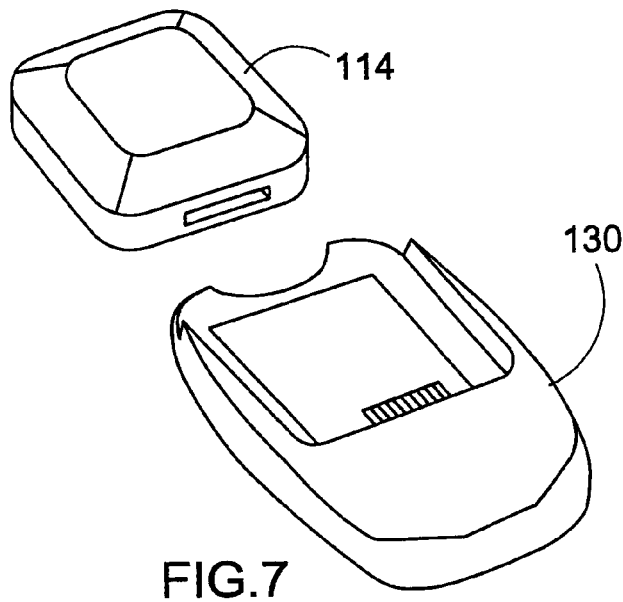
FIG. 7 is a perspective view illustrating another one of the suite of integrated products of the present invention complete and versatile solution for wireless communication and data-transferring between a GPS receiver and a BlueTooth enabled PDA device (or a similarly equipped cellular phone or notebook computer), showing a BlueTooth docking station for a GPS receiver.
Figure 8:
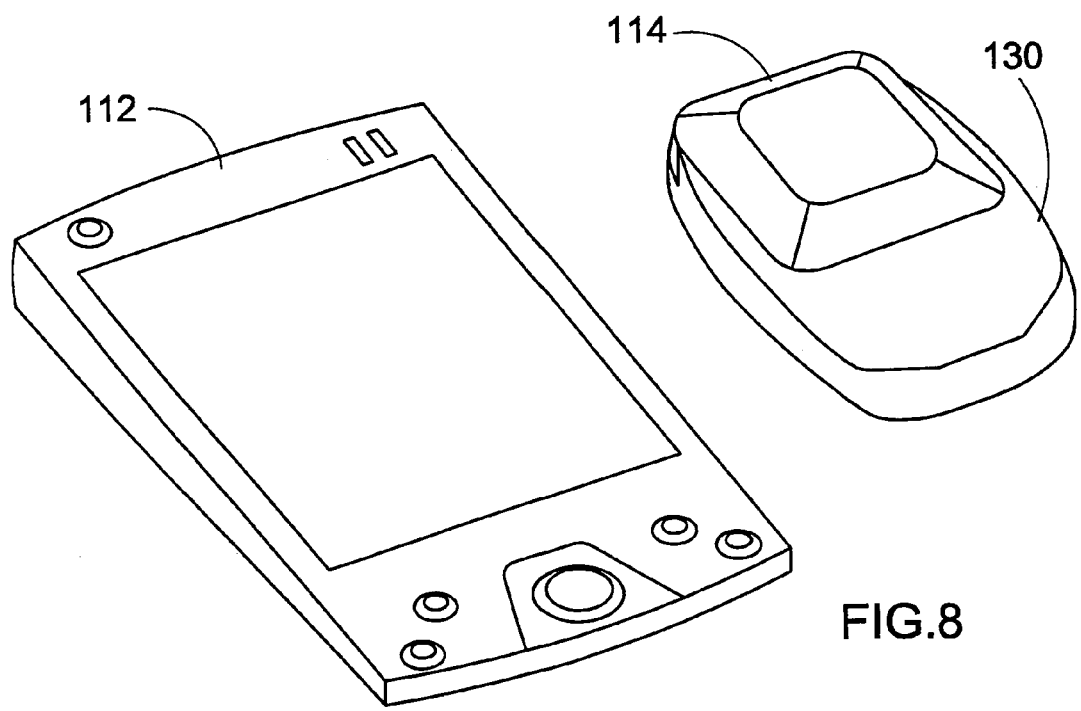
FIG. 8 is a perspective view illustrating the GPS receiver docked on the BlueTooth docking station and in wireless communication with the BlueTooth enabled PDA device (or a similarly equipped cellular phone or notebook computer)

Referring to FIGS. 7 and 8, there is shown a BlueTooth docking station 130 for docking a GPS receiver 114 and providing communication and data-transfer between a BlueTooth enabled PDA device 112 and the GPS receiver 130.

The BlueTooth docking station 130 has a housing 132 that forms the base of the docking station 130 and contains the integrated circuit (IC) components for carrying out the wireless communication and data-transfer functions based on the BlueTooth technology. The docking station 130 may be powered by an external power source such as from a vehicle cigaret lighter socket 46 (shown in FIG. 1) through a cable assembly similar to the ones shown in FIGS. 2 and 3, or powered alternatively by an internal battery power source.

On the top surface of the housing 132 there is provided a recess 134 for receiving the GPS receiver 114, and a male type terminal connector 136 for insertion into the complimentary female terminal connector slot or socket of the GPS receiver 114 to establish electrical connection and electronic communication between the GPS receiver 114 and the internal components of the docking station 130. According to this configuration, the GPS receiver 114 is powered through the docking station 130.

Figure 9:
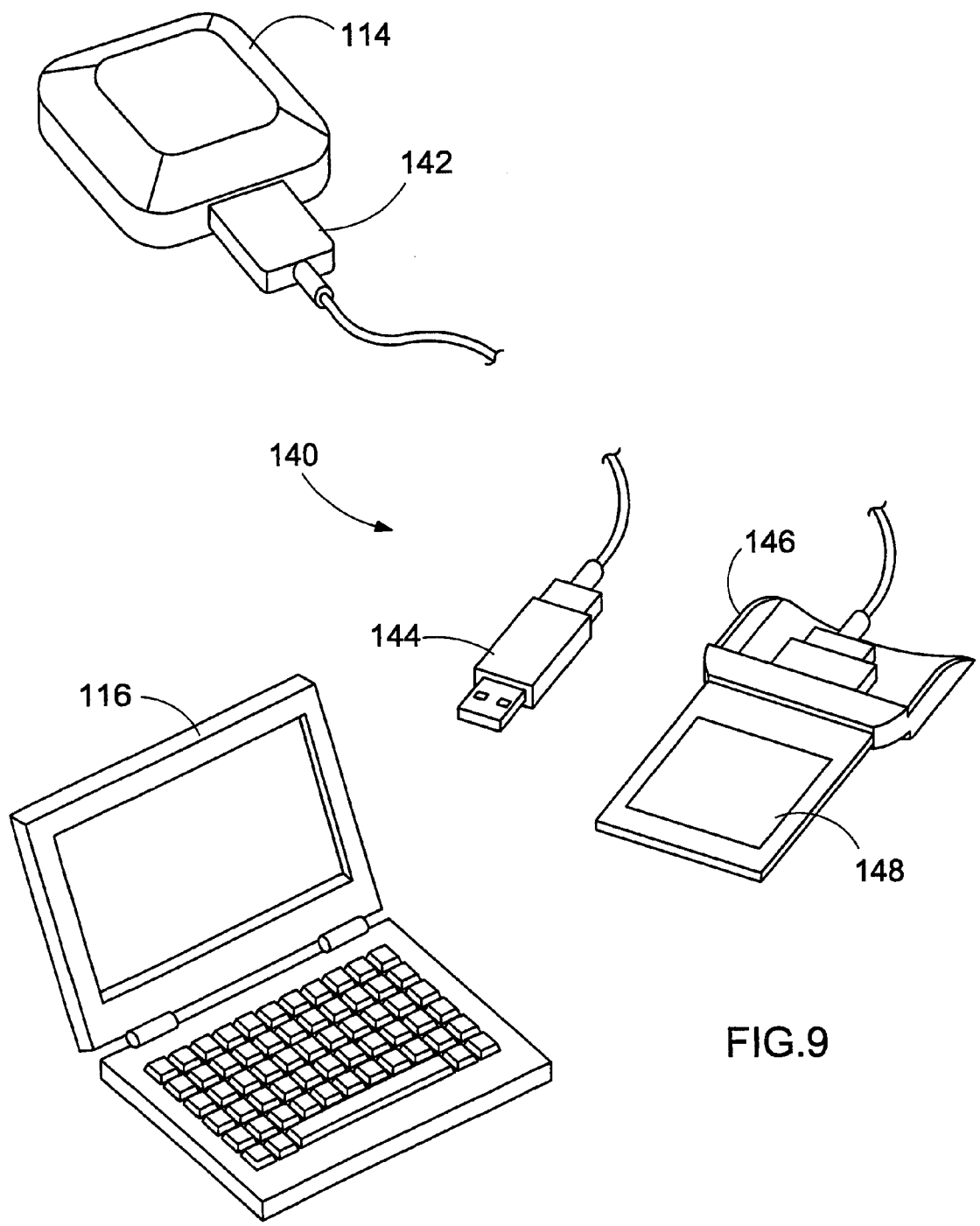
FIG. 9 is a perspective view illustrating another one of the suite of integrated products of the present invention complete and versatile solution for wireless communication and data-transferring between a GPS receiver and a notebook computer (or a similarly equipped device), showing a USB cable and/or a PC card adaptor.

Referring to FIG. 9, the present invention's total solution also provides a set of cable links 140 for interconnecting a GPS receiver 114 and a notebook or laptop computer 116. One end of each cable link has a male type terminal connector 142 that can be plugged into the complimentary female terminal connector slot or socket of the GPS receiver 114. The other end of the cable links may have a USB connector 144 that can be plugged into the USB port of notebook or laptop computer 116, or a PC card adaptor 146 that can be attached to a PC card 148 for insertion into the PC card slot of the notebook or laptop computer 116. This connection establishes the electrical coupling and electronic communication and data-transfer between the GPS receiver 114 and the notebook or laptop computer 116. According to this configuration, the GPS receiver 114 is powered through the notebook or laptop computer 116.

Furthermore, the present invention is also directed to a complete and versatile connection solution that includes a suite of integrated products for communication and data-transfer between a GPS receiver and a PDA device (or a similarly equipped cellular phone or notebook computer) that are compatible with the more recent and advanced data communication and transfer devices and protocols.

These additional product features and functions of the present invention have many advantages. Most importantly, these additional product features and functions of the present invention provide a unique and versatile solution that offers a complete suite of integral products for electrical coupling and electronic communication and data-transfer between GPS receivers and PDA devices, or similarly equipped cellular phones, and notebook or laptop computers, to form an instant mobile navigation system.

Accordingly, also defined broadly, the present invention is an integrated connection assembly for a global positioning satellite (GPS) receiver and a personal digital assistance (PDA) device or cellular phone that has a Compact/Flash card slot, comprising: (a) an integral adaptor having an upper section and a lower section; (b) the upper section of the integral adaptor having a flat extended backing panel and two oppositely disposed wrapped-around side guards for receiving and retaining the GPS receiver; (c) the lower section of the integral adaptor having internal integrated circuitry components for carrying out electronic communication and data-transfer with the PDA device or cellular phone, and an external profile of a Compact/Flash card for insertion into the Compact/Flash card slot of the PDA device or cellular phone; (d) a terminal connector integrally formed at the junction of the upper and lower sections of the integral adaptor for connection with a terminal port of the GPS receiver; and (e) the terminal connector connected to the internal integrated circuitry components of the integral adaptor for establishing electrical continuity and electronic communication and data-transfer between the GPS receiver and the PDA device or cellular phone through the integral adaptor.

Also defined alternatively broadly, the present invention is an integrated connection assembly for a global positioning satellite (GPS) receiver and a portable electronic device that is BlueTooth enabled, comprising: (a) an integral docking station having a housing and internal integrated circuitry components for carrying out wireless electronic communication and data-transfer based on BlueTooth technology with the BlueTooth enabled portable electronic device; (b) the housing of the docking station also having a top surface with a recess for receiving and retaining the GPS receiver; (c) an electrical power source for providing electrical power to the internal integrated circuitry components of the docking station; (d) the docking station further having a terminal connector integrally formed with the housing and located adjacent to the recess at the top surface of the housing for connection with a terminal port of the GPS receiver; and (e) the terminal connector connected to the internal integrated circuitry components of the docking station for powering the GPS receiver and establishing electronic communication and data-transfer between the GPS receiver and the BlueTooth enabled portable electronic device through the docking station.

Also further defined broadly, the present invention is an integrated connection assembly for a global positioning satellite (GPS) receiver and a portable computer having an interface device, comprising: (a) a GPS receiver connector for connecting to the GPS receiver; (b) an interface connector for connecting to the interface device of the portable computer; (c) a filter unit having internal filter circuitry for preventing interferences between the GPS receiver and the portable computer; and (d) a cable link for electrically and electronically interconnecting and coupling the GPS receiver connector, the interface connecter and the filter unit, to establish electrical continuity and electronic communication between the GPS receiver and the portable computer, wherein at least portion of the cable link between the RPS receiver connector and the interface connector is cable of providing data-transfer therebetween.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. An integrated connection assembly for a global positioning satellite (GPS) receiver and a personal digital assistance (PDA) device or cellular phone that has a Compact/Flash card slot, comprising:
   a. an integral adaptor having an upper section and a lower section;
   b. said upper section of said integral adaptor having a flat extended backing panel and two oppositely disposed wrapped-around side guards for receiving and retaining said GPS receiver;
   c. said lower section of said integral adaptor having internal integrated circuitry components for carrying out electronic communication and data-transfer with said PDA device or cellular phone, and an external profile of a Compact/Flash card for insertion into said Compact/Flash card slot of said PDA device or cellular phone;

d. a terminal connector integrally formed at the junction of said upper and lower sections of said integral adaptor for connection with a terminal port of said GPS receiver; and e. said terminal connector connected to said internal integrated circuitry components of said integral adaptor for establishing electrical continuity and electronic communication and data-transfer between said GPS receiver and said PDA device or cellular phone through said integral adaptor.

2. The integrated connection assembly in accordance with claim 1, wherein said terminal port of said GPS receiver is a female slot and said terminal connector of said integral adaptor is a complementary male connector.

3. The integrated connection assembly in accordance with claim 1, wherein said GPS receiver is powered by said PDA device or cellular phone when it is connected said PDA or cellular phone by said integral adaptor.

4. The integrated connection assembly in accordance with claim 1, further comprising a cable link assembly which comprises:

a. a power adapter having an external power connector adapted to be connected to an external power source for obtaining electrical power, and an internal transformer and charger for converting said external electrical power to a direct current power suitable for said PDA device or cellular phone;

b. a PDA or cellular phone connector for connecting to said PDA device or cellular phone; and c. a cable link for electrically and electronically interconnecting and coupling said power adapter and said PDA or cellular phone connector to provide said direct current power to said PDA device or cellular phone.

5. The integrated connection assembly in accordance with claim 4, wherein said external power connector of said power adapter is a plug designed to be connected to a vehicle power socket for obtaining power from a vehicle power source.

6. An integrated connection assembly for a global positioning satellite (GPS) receiver and a portable electronic device that is BlueTooth enabled, comprising:

a. an integral docking station having a housing and internal integrated circuitry components for carrying out wireless electronic communication and data-transfer based on BlueTooth technology with said BlueTooth enabled portable electronic device;

b. said housing of said docking station also having a top surface with a recess for receiving and retaining said GPS receiver;

c. an electrical power source for providing electrical power to said internal integrated circuitry components of said docking station;

d. said docking station further having a terminal connector integrally formed with said housing and located adjacent to said recess at said top surface of said housing for connection with a terminal port of said GPS receiver; and e. said terminal connector connected to said internal integrated circuitry components of said docking station for powering said GPS receiver and establishing electronic communication and data-transfer between said GPS receiver and said BlueTooth enabled portable electronic device through said docking station.

7. The integrated connection assembly in accordance with claim 6, wherein said terminal port of said GPS receiver is a female slot and said terminal connector of said docking station is a complementary male connector.

8. The integrated connection assembly in accordance with claim 6, wherein said BlueTooth enabled portable electronic device is a personal digital assistance (PDA) device.

9. The integrated connection assembly in accordance with claim 6, wherein said BlueTooth enabled portable electronic device is a cellular phone.

10. The integrated connection assembly in accordance with claim 6, wherein said BlueTooth enabled portable electronic device is a notebook computer.

11. The integrated connection assembly in accordance with claim 6, wherein said BlueTooth enabled portable electronic device is a laptop computer.

12. The integrated connection assembly in accordance with claim 6, wherein said electrical power source of said docking station is provided by at least one internal battery.

13. The integrated connection assembly in accordance with claim 6, further comprising a cable link assembly which comprises:

a. a power adapter having an external power connector adapted to be connected to an external power source for obtaining electrical power, and an internal transformer and charger for converting said external electrical power to a direct current power suitable for said integral docking station, said GPS receiver, and said portable electronic device;

b. a filter unit having internal filter circuitry for preventing interferences between said GPS receiver through said docking station and said portable electronic device;

c. a docking station connector for connecting to said docking station;

d. a portable electronic device connector for connecting to said portable electronic device; and e. a cable link for electrically and electronically interconnecting and coupling said power adapter, said filter unit, said docking station connecter and said portable electronic device connector to provide said direct current power to said GPS receiver through said docking station and to said portable electronic device.

14. The integrated connection assembly in accordance with claim 13, wherein said external power connector of said power adapter is a plug designed to be connected to a vehicle power socket for obtaining power from a vehicle power source.

15. The integrated connection assembly in accordance with claim 13, wherein said filter unit is connected between said docking station connecter and said portable electronic device connecter.

16. An integrated connection assembly for a global positioning satellite (GPS) receiver and a portable computer having an interface device, comprising:

a. a GPS receiver connector for connecting to said GPS receiver;

b. an interface connector for connecting to said interface device of said portable computer;

c. a filter unit having internal filter circuitry for preventing interferences between said GPS receiver and said portable computer; and d. a cable link for electrically and electronically interconnecting and coupling said GPS receiver connector, said interface connecter and said filter unit, to establish electrical continuity and electronic communication between said GPS receiver and said portable computer, wherein at least portion of the cable link between said GPS receiver connector and said interface connector is cable of providing data-transfer therebetween.

17. The integrated connection assembly in accordance with claim 16, wherein said portable computer is a notebook computer.

18. The integrated connection assembly in accordance with claim 16, wherein said portable computer is a laptop computer.

19. The integrated connection assembly in accordance with claim 16, wherein said interface device is an USB port.

20. The integrated connection assembly in accordance with claim 16, wherein said interface device comprises a PC card slot and said interface connecter comprises a PC card.

* * * * *